US012241307B2

(12) United States Patent
Marotte et al.

(10) Patent No.: US 12,241,307 B2
(45) Date of Patent: Mar. 4, 2025

(54) CONNECTION SYSTEM FOR A HEADER AND A JAMB OF A DOOR ASSEMBLY

(71) Applicant: Allegion Access Technologies LLC, Carmel, IN (US)

(72) Inventors: Benjamin Marotte, Springfield, MA (US); James Cavanaugh, Las Vegas, NV (US); Ronald R. Laliberte, Prospect, CT (US); Vinay Patel, Rocky Hill, CT (US)

(73) Assignee: Allegion Access Technologies LLC, Carmel, IN (US)

( * ) Notice: Subject to any disclaimer, the term of this patent is extended or adjusted under 35 U.S.C. 154(b) by 248 days.

(21) Appl. No.: 18/047,778

(22) Filed: Oct. 19, 2022

(65) Prior Publication Data

US 2024/0133230 A1 Apr. 25, 2024
US 2024/0229545 A9 Jul. 11, 2024

(51) Int. Cl.
*E06B 3/96* (2006.01)

(52) U.S. Cl.
CPC .................................. *E06B 3/9624* (2013.01)

(58) Field of Classification Search
CPC ........ E06B 3/96; E06B 3/9687; E06B 3/9647; E06B 3/9624; E06B 3/9632
USPC ........................................................ 52/204.1
See application file for complete search history.

(56) References Cited

U.S. PATENT DOCUMENTS 3,879,017 A * 4/1975 Maxcy .................. E04F 11/181 256/22
4,205,486 A * 6/1980 Guarnacci ............. E06B 3/5454 403/231
5,375,383 A * 12/1994 Lin ....................... E06B 3/9642 52/656.2
5,450,701 A * 9/1995 White ....................... E06B 9/52 160/381
6,763,639 B2 * 7/2004 Bennett ................. E06B 3/9632 49/504
7,788,863 B2 * 9/2010 Pepper .................... E06B 3/365 49/504
8,033,056 B2 * 10/2011 Wernlund ................. E06B 1/70 49/408
10,626,664 B1 * 4/2020 Kelley .................. E06B 1/6015
10,844,654 B1 * 11/2020 Smith ................... E06B 3/9632
2002/0112421 A1 * 8/2002 Bennett ................. E06B 1/6092 52/204.1

(Continued)

FOREIGN PATENT DOCUMENTS

CN 215980307 U 3/2022
EP 2055885 A2 5/2009
EP 2233676 A2 9/2010

OTHER PUBLICATIONS

Machine translation of EP2233676, PhiTechnik fur Fenster 2010.*

(Continued)

*Primary Examiner* — Paola Agudelo
(74) *Attorney, Agent, or Firm* — Taft Stettinius & Hollister LLP

(57) ABSTRACT

One or more embodiments includes a door assembly with a door jamb and a door header. A connection system is provided that directs the weight of the door header directly into the door jamb. Load on the fasteners is reduced by the connection system along with the potential for slippage for the door header after installation.

25 Claims, 11 Drawing Sheets

(56) References Cited

U.S. PATENT DOCUMENTS

| | | | | |
|---|---|---|---|---|
| 2003/0005589 | A1* | 1/2003 | Hale | G01C 9/28<br>33/194 |
| 2003/0005644 | A1* | 1/2003 | Reithmeyer | E05D 7/0027<br>49/467 |
| 2003/0106269 | A1* | 6/2003 | Bauman | E06B 3/9632<br>49/467 |
| 2005/0198911 | A1* | 9/2005 | Baczuk | E06B 3/9632<br>49/504 |
| 2007/0240373 | A1* | 10/2007 | Yu | E06B 3/9632<br>52/213 |
| 2015/0267460 | A1* | 9/2015 | Header | E06B 3/26303<br>52/204.5 |

OTHER PUBLICATIONS

International Search Report; ISA/US; International Application No. PCT/US2023/035506; Feb. 9, 2024; 2 pages.
Written Opinion of the International Searching Authority; ISA/US; International Application No. PCT/US2023/035506; Feb. 9, 2024; 6 pages.

* cited by examiner

CONNECTION SYSTEM FOR A HEADER AND A JAMB OF A DOOR ASSEMBLY

TECHNICAL FIELD

One or more embodiments set forth herein relate to a door assembly, and more particularly to a connection system for a door header and a door jamb of the door assembly.

BACKGROUND

Door assemblies typically include door jambs along the sides of the door opening, and a door mounted to at least one of the door jambs. The door assembly also includes a door header that extends between and connects the door jambs.

Typically, the door jambs are connected to the door header with fasteners positioned in clearance holes of the door jamb and/or door header. The alignment of the door header to the door jamb is typically finely adjusted by the installation technician to ensure proper operation of the door. This alignment adjustment can require a significant amount of time, and the clearance holes provided for adjustment can cause the fasteners to be load bearing. The load bearing on the fasteners could cause slippage in the header to jamb connection if the fastener loading is too high.

SUMMARY

One or more embodiments includes a door assembly with at least one door, and a frame for receiving the door. The frame includes at least one jamb and a header. A connection system is provided that directs all or a portion of the weight of the header directly into the jamb while assisting in aligning the header and the jamb during installation. Load on the fasteners is reduced by the connection system along with the potential for slippage of the header after installation.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DRAWINGS

The various advantages of the exemplary embodiments will become apparent to one skilled in the art by reading the following specification and appended claims, and by referencing the following drawings, in which:

DESCRIPTION

Figure 1:
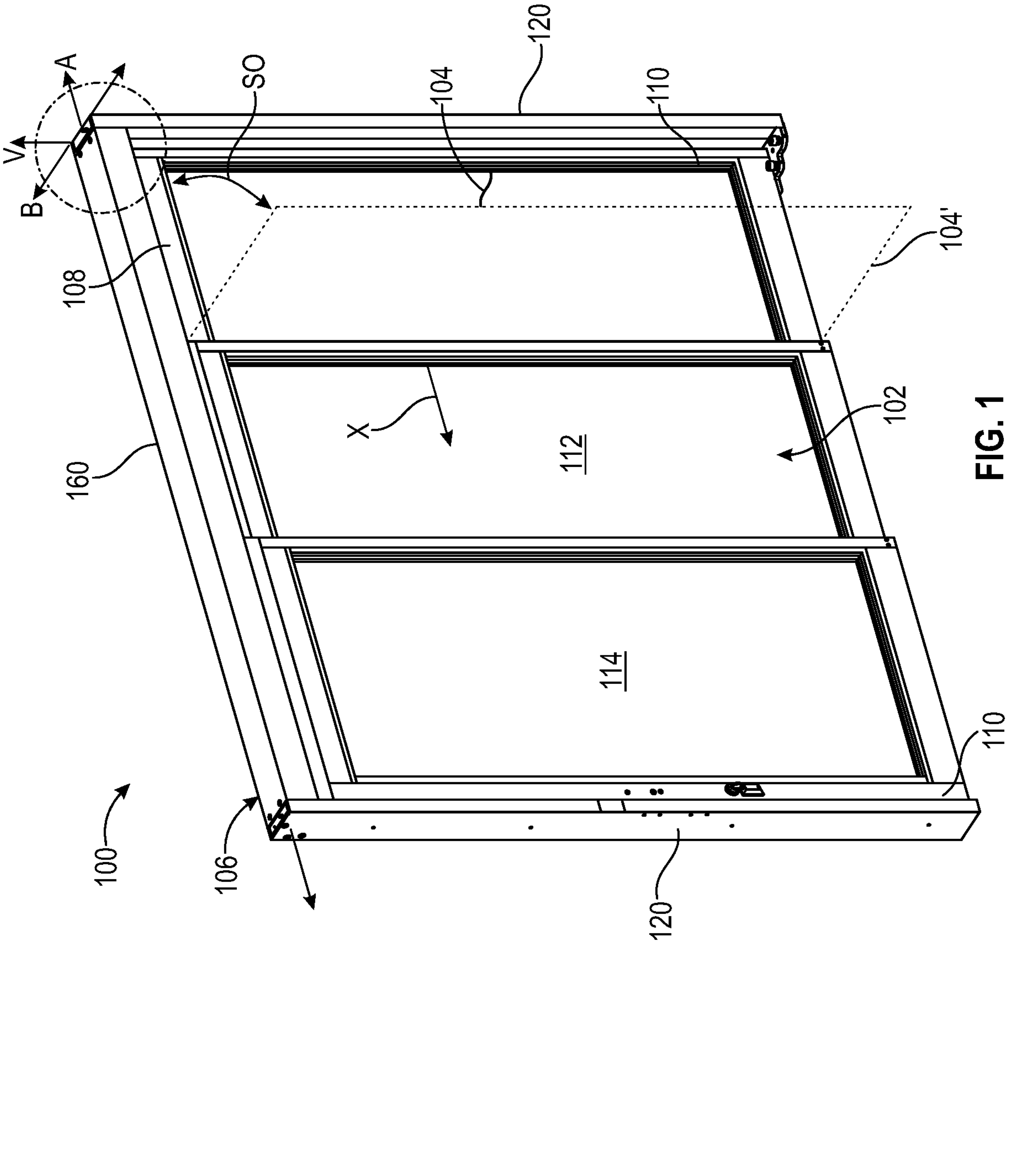
FIG. 1 is a front perspective view of a door assembly, in accordance with one or more embodiments set forth, described, and/or illustrated herein.

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific terminology will be used to describe the same. It shall nevertheless be understood that no limitation of the scope of the invention is thereby created and that the invention includes and protects such alterations, modifications, and further applications of the exemplary embodiments as would occur to one skilled in the art.

A door assembly 100 is disclosed herein in FIGS. 1-12. The door assembly 100 includes at least one jamb 120, at least one header 160, and a connection system 200 that connects the at least one header 160 to the at least one jamb 120. The connection system 200 is configured to locate and align the at least one header 160 and the at least one jamb 120 relative to one another during installation while reducing fastener loading after installation.

In an embodiment, the door assembly 100 includes a door 102 having at least one panel 104 movable between an open position and a closed position. The door assembly 100 also includes a frame 106 for receiving the door 102. The frame 106 includes header 160 extending in a horizontal or first direction A along a top 108 of the door 102. The frame 106 includes jamb 120 extending in a vertical or second direction V transversely to the first direction A along a side 110 of the door 102.

The frame 106 includes connection system 200 for connecting the header 160 and the jamb 120. The connection system 200 includes a header mounting block 260 connected to the header 160 and a jamb mounting block 220 connected to the jamb 120. The jamb mounting block 220 and the header mounting block 260 are engaged to one another with a plurality of protrusions 222, 224, 226 that are received within corresponding ones of a plurality of receptacles 262, 264, 266. The engaged protrusions 222, 224, 226 and receptacles 262, 264, 266 of the jamb mounting block 220 and the header mounting block 260 align the header 160 and the jamb 120 with one another and support the header 160 on the jamb 120.

In an embodiment, connection system 200 is provided for connecting header 160 and jamb 120 of frame 106 for door 102. The connection system 200 includes jamb mounting block 220 configured to be engaged to an upper end 122 of the jamb 120, and header mounting block 260 configured to be engaged to an end 162 of the header 160. The connection system 200 includes a plurality of protrusions 222, 224, 226 that extend from at least one of the jamb mounting block 220 and the header mounting block 260, and a plurality of receptacles 262, 264, 266 that extend into at least one of the jamb mounting block 220 and the header mounting block 260. The plurality of protrusions 222, 224, 226 and the plurality of receptacles 262, 264, 266 are configured to engage one another to align the header 160 and the jamb 120 and support the header 160 on the jamb 120.

Referring to FIG. 1, door assembly 100 is shown with door 102 mounted in a frame 106. Door 102 includes at least one panel 104 movable between a closed position as shown and an open position 104' by movement in a swing out direction indicated by arrow SO. In the illustrated embodiment, each of the panels 104, 112, 114 can be opened by pivoting movement about hinges (not shown) to provide a door opening of desired size. Panels 112, 114 may also be linearly movable, as indicated by arrow X. In an embodiment, door 102 includes one or more panels opened by pivoting movement about one or more hinges in a swing out and/or swing in direction. In an alternative embodiment, door 102 includes one or more stationary panels. In an alternative embodiment, door 102 includes two panels that are opened by sliding movement away from one another. In an alternative embodiment, door 102 includes one or more panels 104 opened by being displaced upwardly or downwardly along frame 106.

Frame 106 includes vertically extending jambs 120 on each side 110 of door 102, and a header 160 along top 108 of door 102. Header 160 is oriented in a first or horizontal direction A, and jambs 120 are oriented in a second or vertical direction V that is transverse to horizontal direction A. In addition, a front-to-back direction though door 102 is indicated by a third direction B that is transverse to horizontal direction A and vertical direction V.

Figure 2:
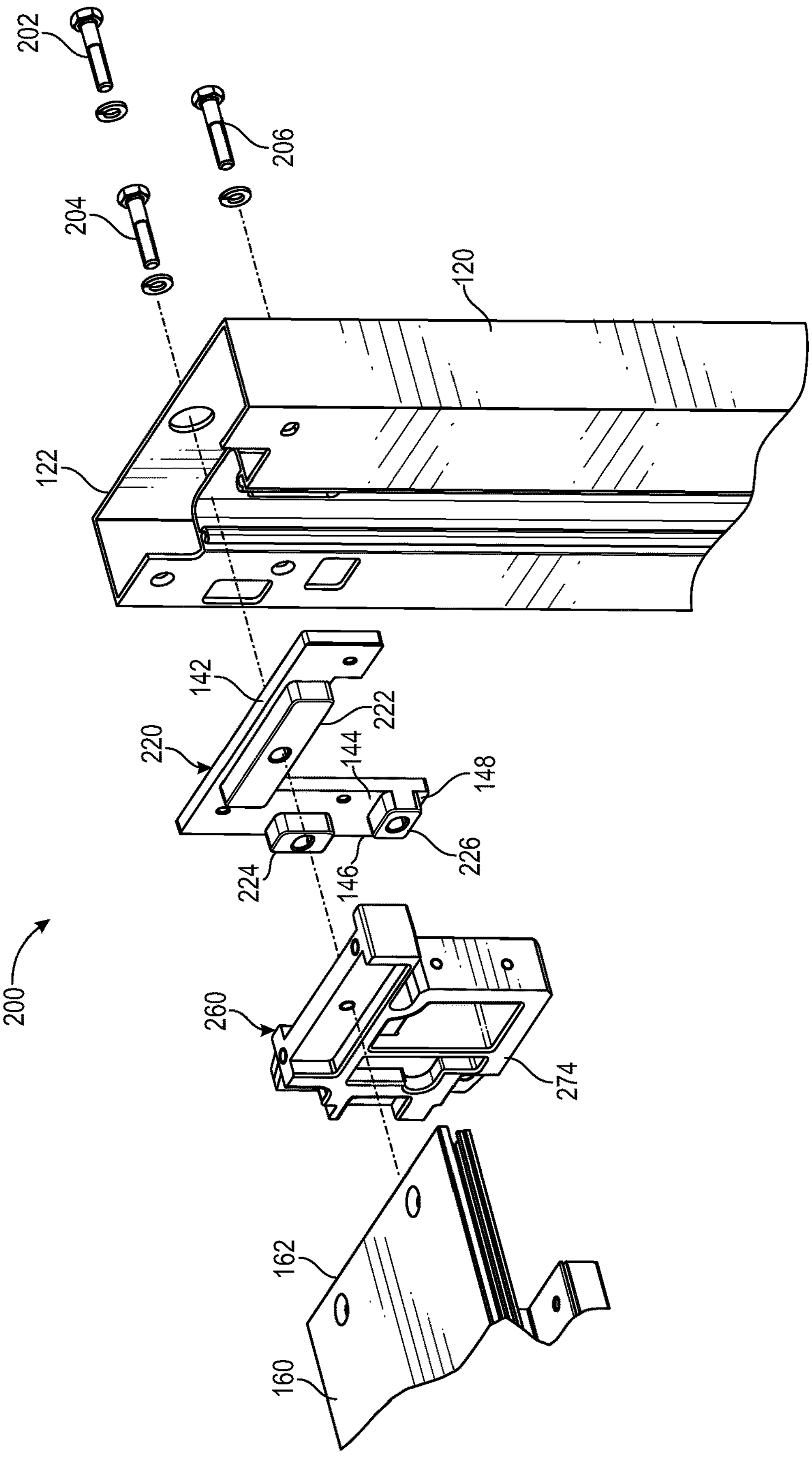
FIG. 2 is an exploded perspective view of a part of a header, a part of a jamb, and a connection system for connecting the header and the jamb of the door assembly of FIG. 1.

During installation of door assembly 100, it is necessary to construct frame 106 in the wall opening that is provided. As shown in FIG. 2, the present disclosure provides a connection system 200 that allows the jamb 120 and header 160 to be quickly aligned with one another, and secured to one another in the aligned position. The header 160 is supported on the jamb 120 by connection system 200 without requiring fasteners to be the primary load transfer mechanism. FIG. 2 shows connection system 200 at one end 162 of header 160 to secure header 160 to an upper end 122 of jamb 120. A second connection system 200 may also be provided at the opposite end of header 160 to secure it to the other jamb 120.

Connection system 200 includes jamb mounting block 220 and header mounting block 260. Jamb mounting block 220 includes protrusions 222, 224, 226 extending through jamb 120 toward header 160. Header mounting block 260 includes receptacles 262, 264, 266 that are configured to receive respective ones of the protrusions 222, 224, 226 to align header 160 with jamb 120. In an embodiment, protrusions 222, 224, 226 correspond in size and shape with the receptacles 262, 264, 266 to fit therein. Since protrusions 222, 224, 226 extend through jamb 120, the weight supported on protrusions 222, 224, 226 is vertically supported on jamb 120. The weight of header 160 is therefore vertically transferred to jamb 120 through protrusions 222, 224, 226.

Figure 3:
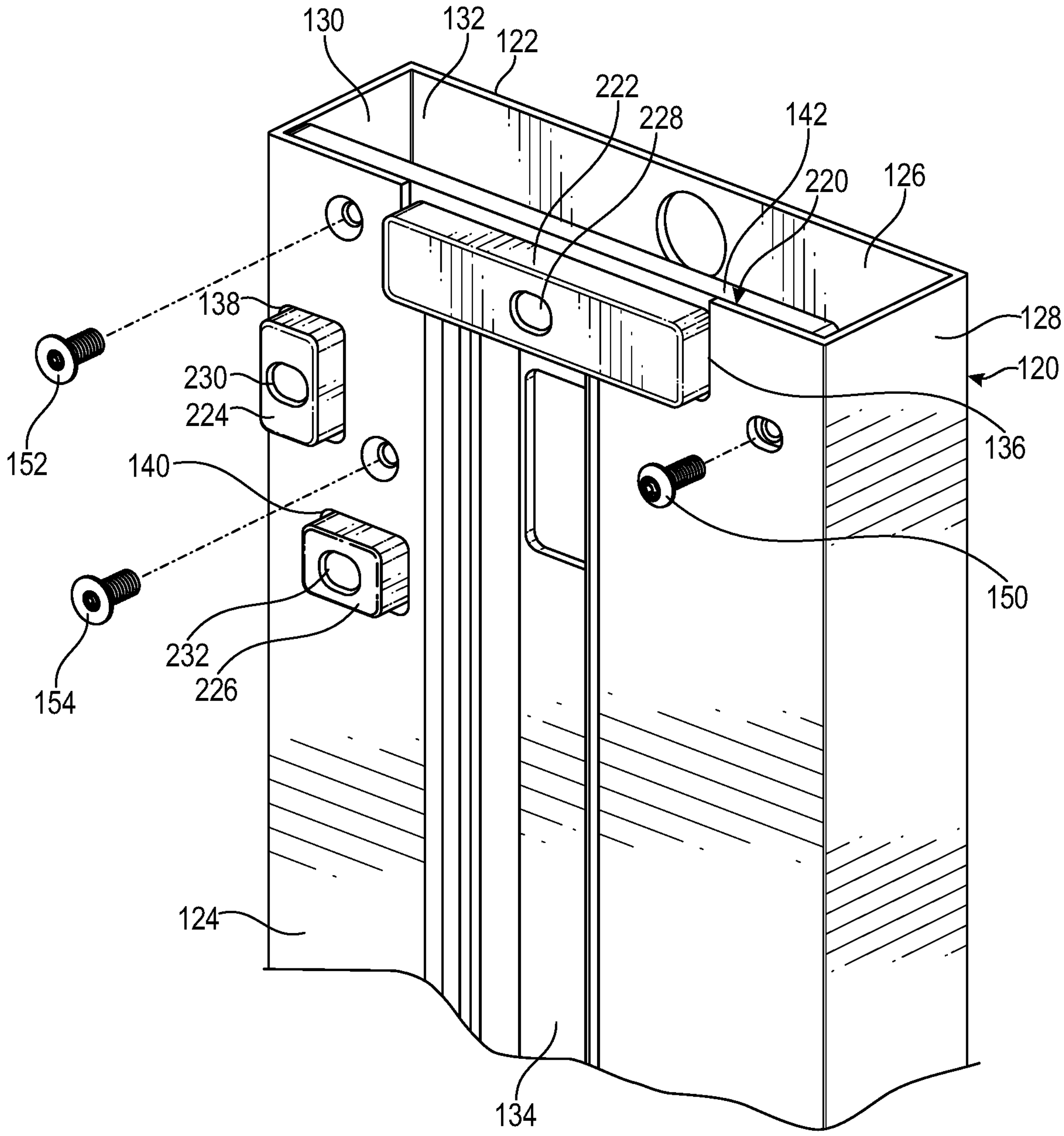
FIG. 3 is a partially exploded perspective view of the upper end of the jamb and a jamb mounting block of the connection system.
Figure 4:
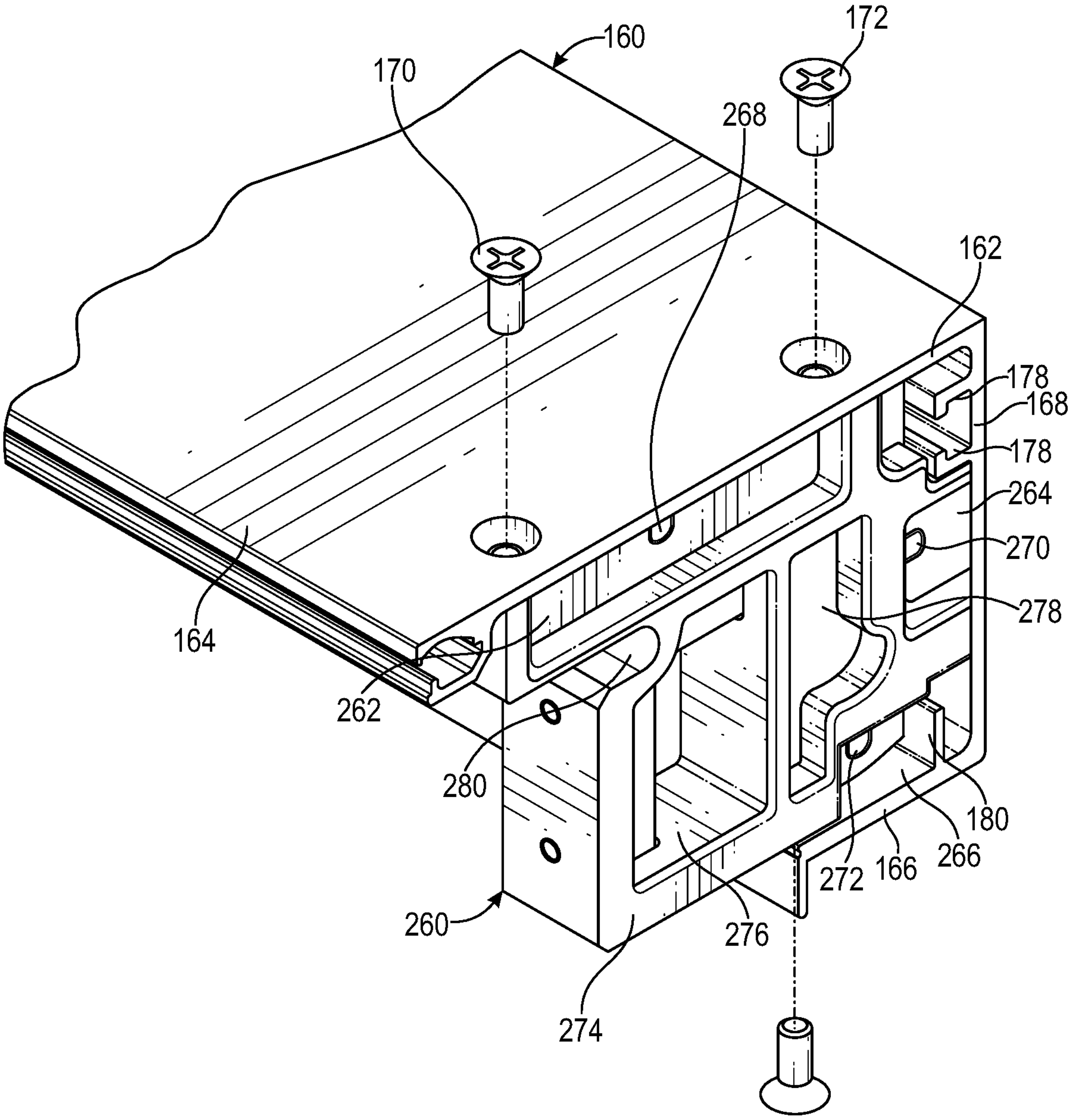
FIG. 4 is a partially exploded perspective view of the end of the header and a header mounting block of the connection system.

Referring further to FIGS. 3-4, fasteners 202, 204, 206 are provided that extend through bores 228, 230, 232 of corresponding ones of the protrusions 222, 224, 226 and into an aligned bore 268, 270, 272 of a corresponding one of the receptacles 262, 264, 266 of header mounting block 260. The fasteners 202, 204, 206 secure protrusions 222, 224, 226 in the receptacles 262, 264, 266 and resist slippage or withdrawal of the header mounting block 260 relative to the jamb mounting block 220. As a result, header 160 is secured to jamb 120 with connection system 200 providing resistance to movement in the vertical direction V, horizontal direction A, and front-to-back direction B.

Jamb 120 includes an inner sidewall 124 that faces door 102 and an opposite outer sidewall 126 spaced from inner sidewall 124. Jamb 120 also includes a front sidewall 128 and a back sidewall 130 that extend between and connect inner sidewall 124 and outer sidewall 126. Jamb 120 further includes an interior passage 132 defined by inner sidewall 124, outer sidewall 126, front sidewall 128, and back sidewall 130.

Inner sidewall 124 includes a vertically extending channel 134 located mid-width on inner sidewall 124. Upper end 122 of jamb 120 also includes a cutout 136 in inner sidewall 124 that forms a pocket for receiving protrusion 222 so that protrusion 122 is above channel 134, and the upper side of protrusion 222 is recessed slightly below upper end 122 of jamb 120. Channel 134 extends through and intersects cutout 136. Jamb mounting block 220 and protrusion 222 span channel 134 and cutout 136. The plurality of protrusions 222, 224, 226 extend through respective ones of the cutout 136 and holes 138, 140 through inner sidewall 124. According, load on protrusions 222, 224, 226 is transmitted directly onto inner sidewall 124.

Jamb mounting block 220 includes a first arm 142 that is configured to extend across the jamb 120 along upper end 122. Protrusion 222 is located on first arm 142. Jamb mounting block 220 includes a second arm 144 that extends transversely to and downwardly from the first arm 142 that is configured to extend along the jamb 120. Protrusion 224 is located on an outer edge 146 of second arm 144. Protrusion 226 is located adjacent to bottom end 148 of second arm 144. Holes 138, 140 are spaced vertically from one another in the vertical direction V and offset from one another in the front-to-back direction B so as to receive protrusions 224, 226 therethrough. Cutout 136 is located above holes 138, 140.

A plurality of fasteners 150, 152, 154 secure jamb mounting block 220 to inner sidewall 124. In the illustrated embodiment, fastener 150 is secured to first arm 142 on the front part of inner sidewall 124, and fasteners 152, 154 are secured to first arm 142 and/or second arm 144 on the back part of inner sidewall 124 on the opposite sides of channel 134. Fasteners 150, 152, 154 can be threaded to threadingly engage jam mounting block 220. However, any suitable fastener for fasteners 150, 152, 154 is contemplated.

Header 160 includes a top flange 164, a bottom flange 166, and a back sidewall 168 connecting the top flange 164 and the bottom flange 166. Top flange 164, bottom flange 166, and back sidewall 168 extend from end 162 in the horizontal direction A. Header mounting block 260 is positioned within header 120 in abutting engagement with top flange 164, bottom flange 166, and back sidewall 168. Fasteners 170, 172 secure header mounting block 260 to top flange 164, and fastener 174 secures header mounting block 260 to bottom flange 166. Fasteners 170, 172, 174 can be threaded to threadingly engage header mounting block 260 and attach it to header 160. However, any suitable fastener for fasteners 170, 172, 174 is contemplated.

In the illustrated embodiment, header 160 further includes an internal channel formed by paired ribs 178 that extend from back sidewall 168, and an internal flange 180 extending upwardly from bottom flange 164. Other embodiments contemplate other configurations for header 160 and/or jamb 120 than those specifically shown and described.

Header mounting block 260 includes a body 274 configured to occupy the space defined by top flange 164, bottom flange 166, back sidewall 168, internal ribs 178, and internal flange 180 at end 162. The plurality of receptacles 262, 264, 266 include a first receptacle 262 defined by the body 274 of header mounting block 260 and is located along the top flange 164. A second receptacle 264 is defined by the body 274 of header mounting block 260 and is located along the back sidewall 168 between internal channel 178 and internal flange 180. A third receptacle 266 is defined by the body 274 of header mounting block 260 and is located along the bottom flange 166 and internal flange 180. Body 274 may also include internal cavities 276, 278 and/or external recesses 280 to facilitate placement into header 160, reduce material and weight, and/or provide some flexibility.

Body 274 and/or header 160 combine to form each of the sides of each of the receptacles 262, 264, 266. Top flange 164 of header 160 therefore is directly supported on the corresponding protrusion 222, while body 274 is directly supported on the corresponding protrusions 224, 226. In another embodiment, one or more protrusions 222, 224, 226 are provided on header mounting block 260, and one or more receptacles 262, 264, 266 are defined by jamb mounting block 220 and/or jamb 120.

Figure 5:
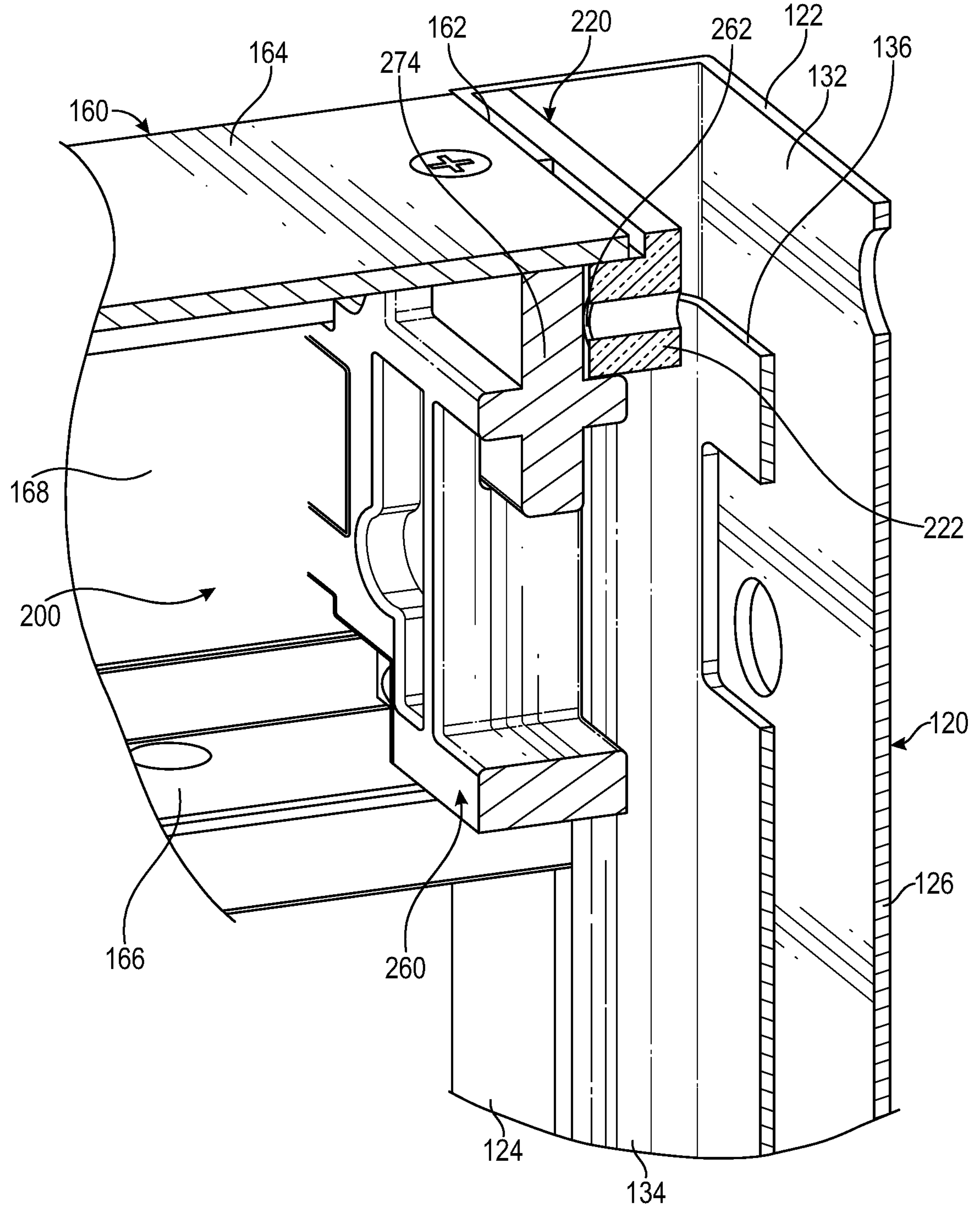
FIG. 5 is a section view of the connection system connecting the header and the jamb.
Figure 6:
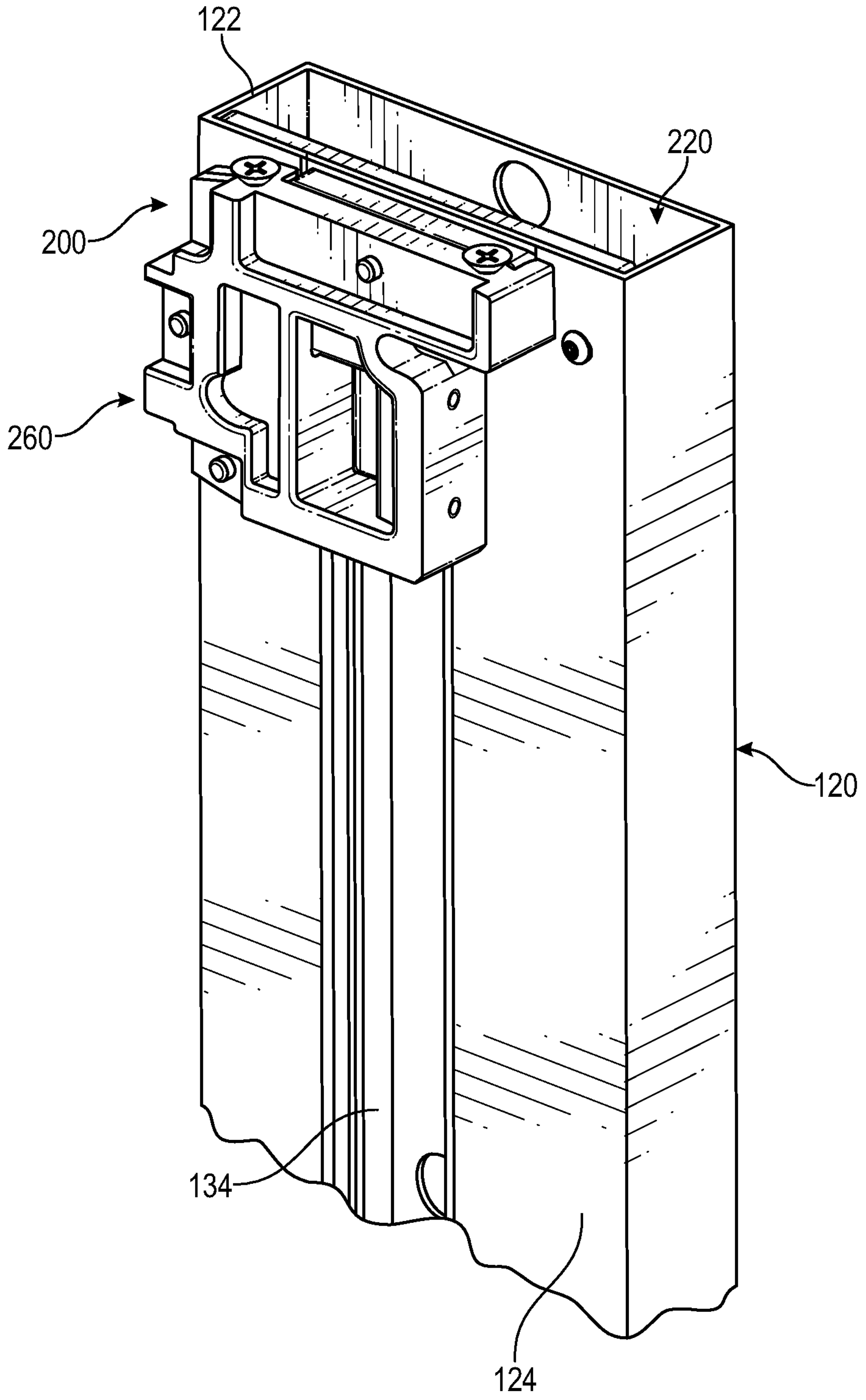
FIG. 6 is a perspective view of the connection system mounted to the jamb with the header removed for clarity.
Figure 7:
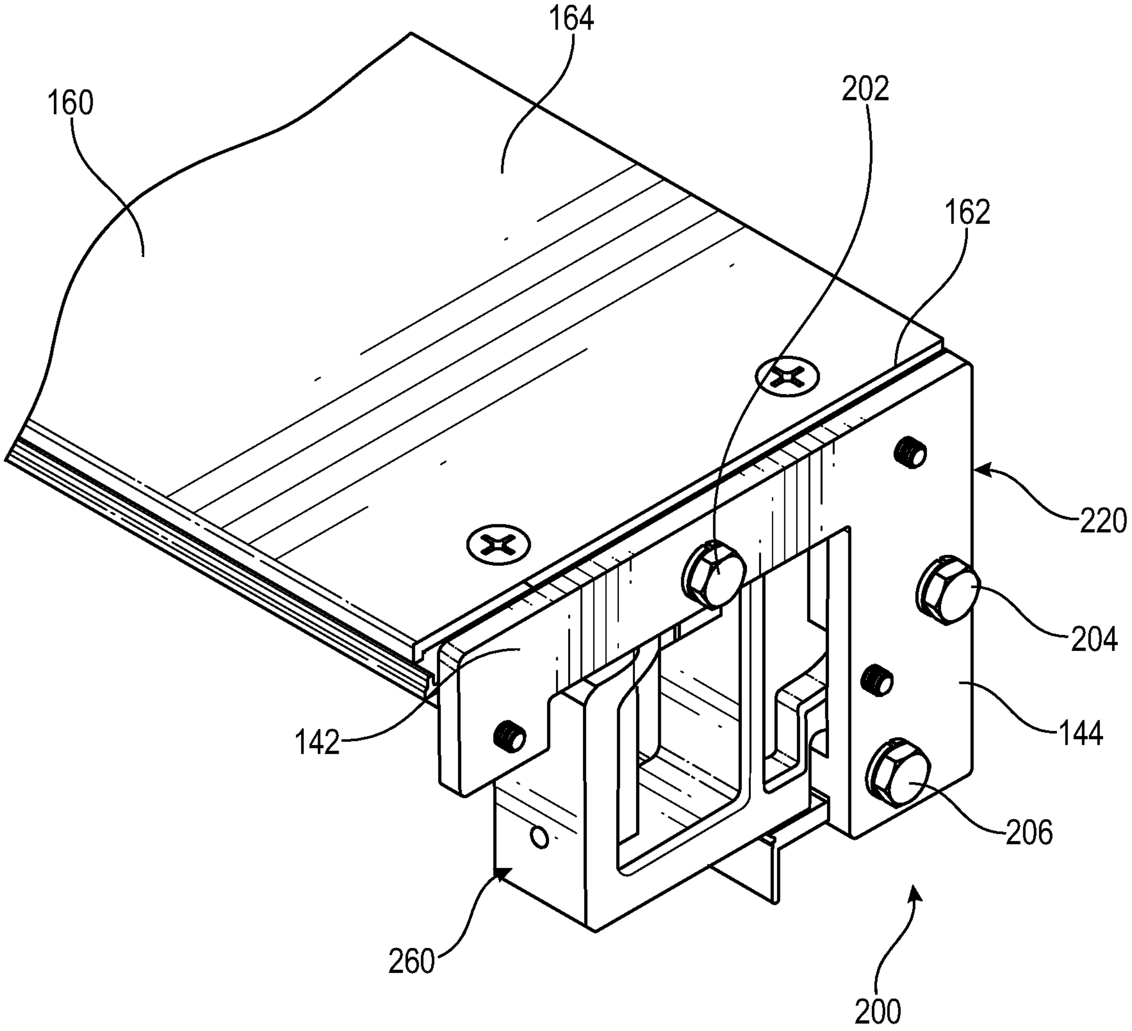
FIG. 7 is a perspective view of the connection system mounted to the header with the jamb removed for clarity.
Figure 8:
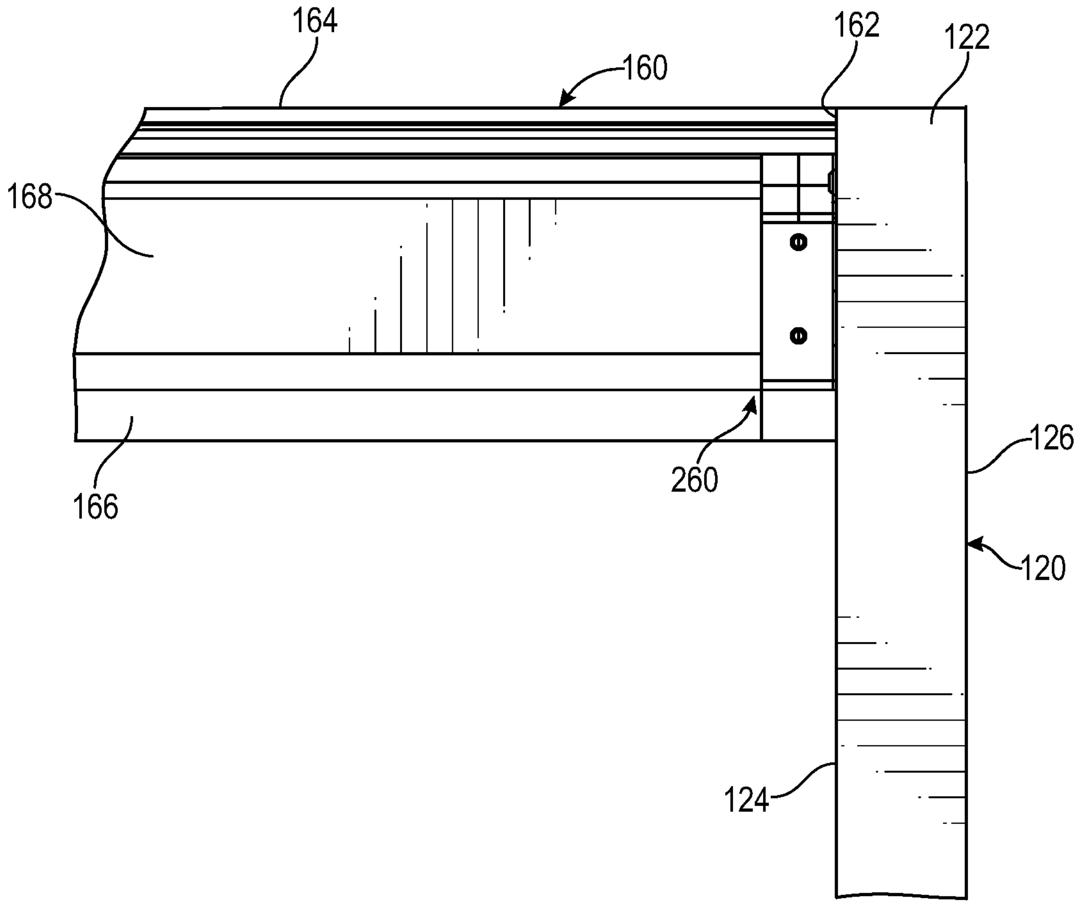
FIG. 8 is a front elevation view of the jamb and header connected to one another with the connection system.
Figure 9:
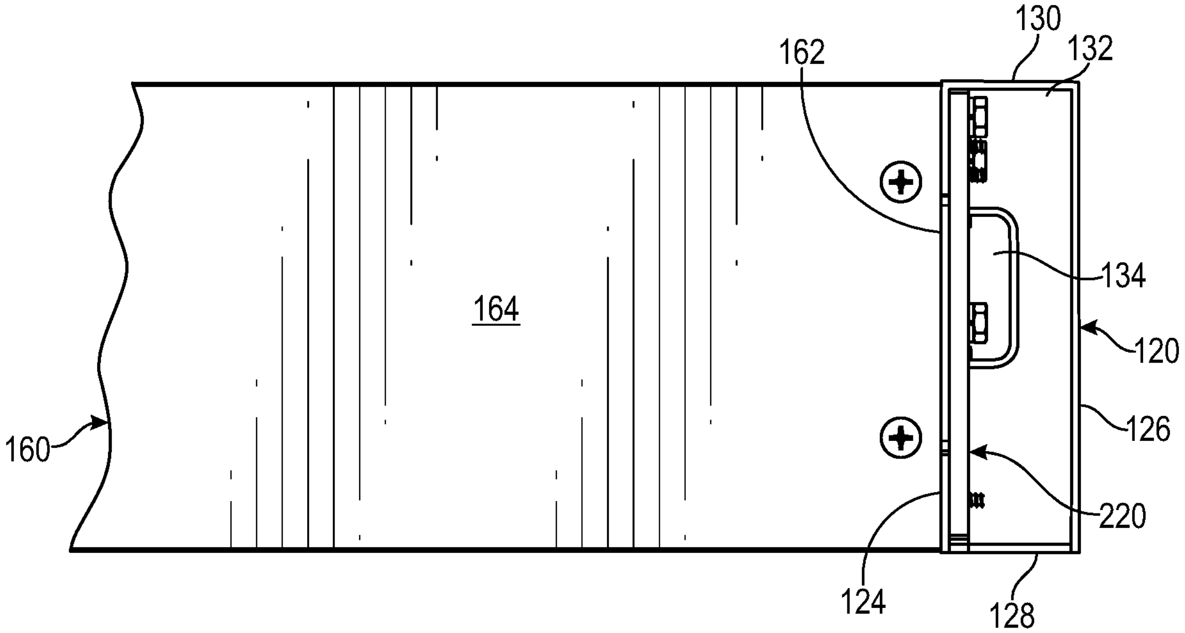
FIG. 9 is a top plan view of FIG. 8.
Figure 10:
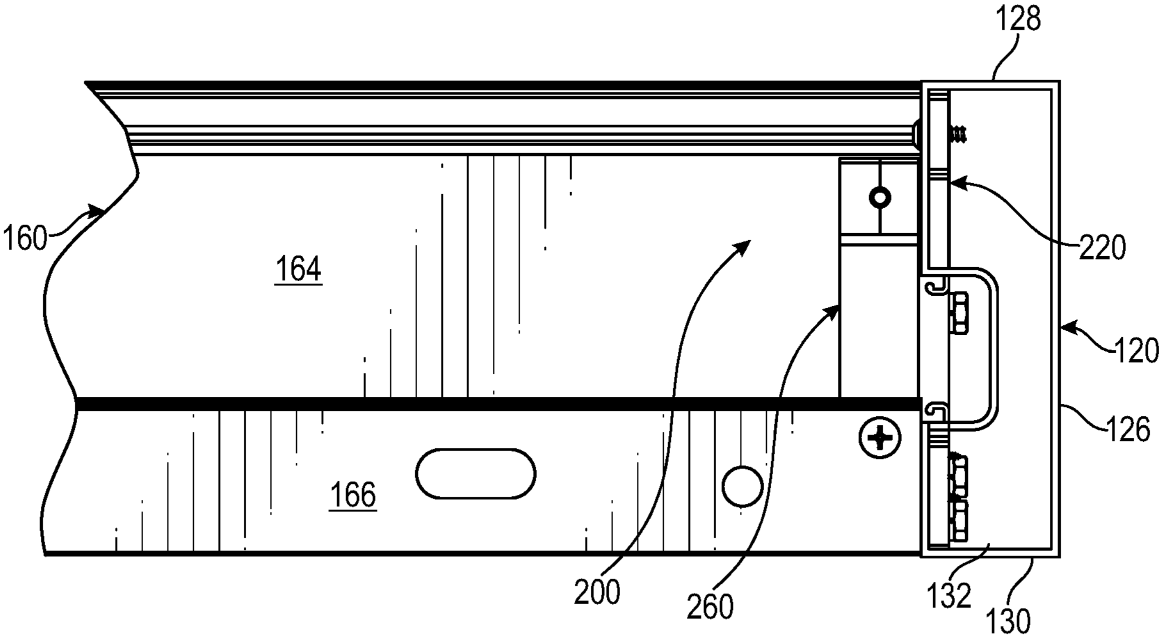
FIG. 10 is a bottom plan view of FIG. 8.
Figure 11:
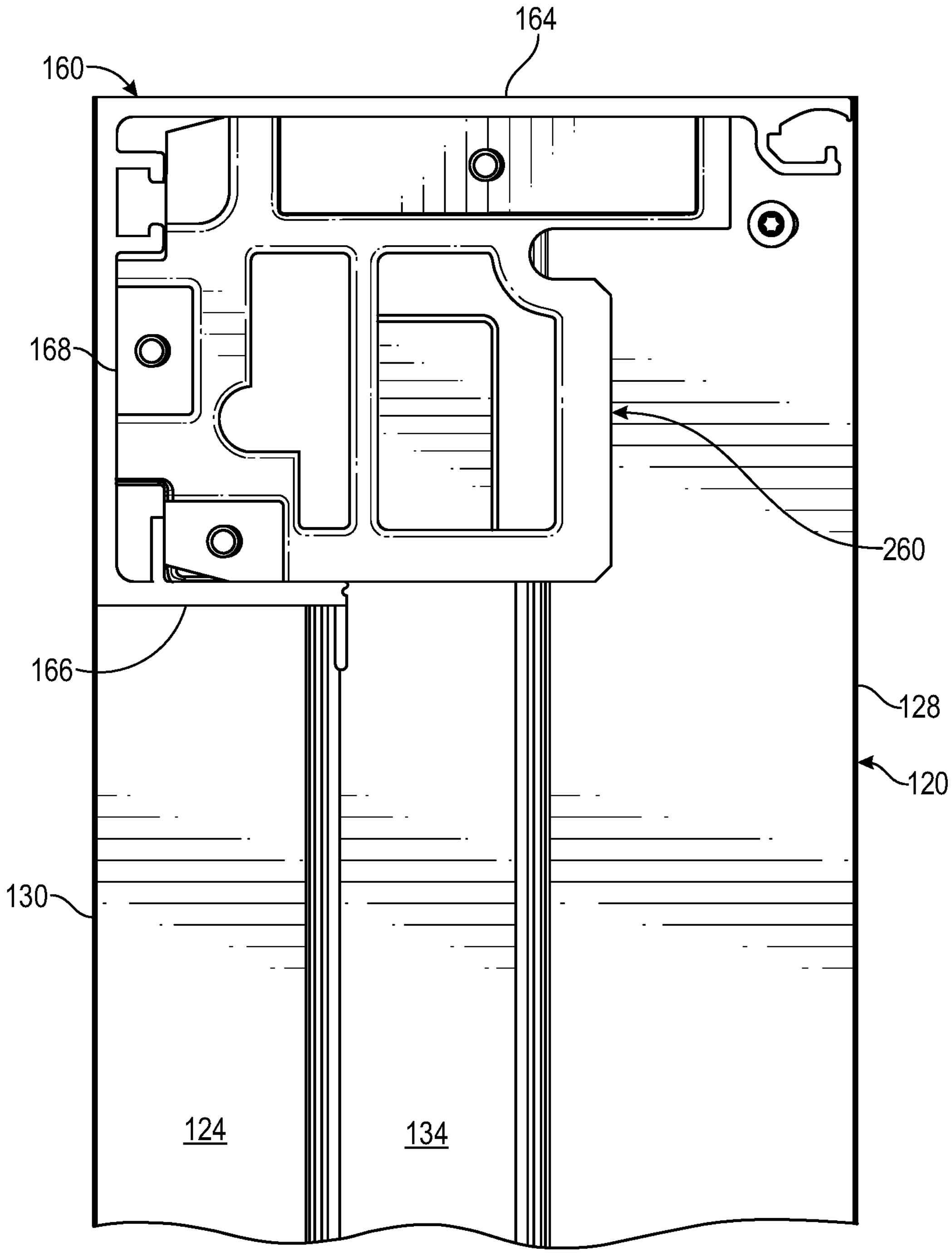
FIG. 11 is a left side elevation view of FIG. 8.

When engaged to one another, top flange 164 is supported on first protrusion 222 with the top surface 176 of top flange 164 aligned with upper end 122 of jamb 120, as shown in FIG. 5. As shown in the assembled condition in FIGS. 6-12, second protrusion 224 is received in second receptacle 264, and aligns and locates the back sidewall 168 of header 160 relative to the back sidewall 130 of jamb 120. Third protrusion 226 is received in third receptacle 266, and assists in providing vertical and rotational alignment of header 160 with jamb 120 in conjunction with the other protrusions and receptacles.

Figure 12:
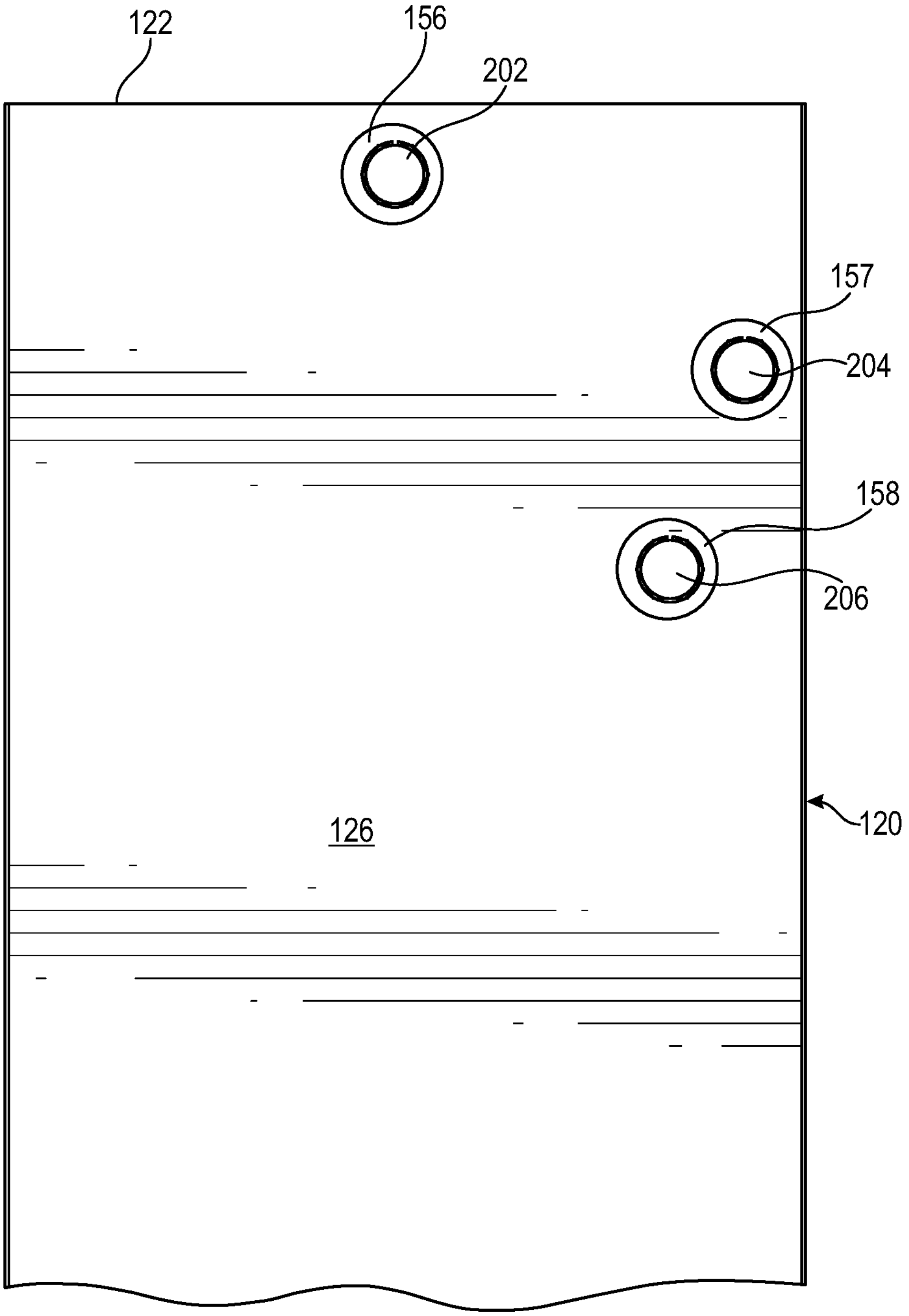
FIG. 12 is a right side elevation view of FIG. 8.

Outer sidewall 126 of jamb 120 may include openings 156, 157, 158 (FIG. 12.) Openings 156, 157, 158 are located to allow insertion of fasteners 202, 204, 206 into jamb 120 and into bores 228, 230, 232 of corresponding ones of the protrusions 222, 224, 226 and into the aligned bore 268, 270, 272 of the receptacles 262, 264, 266 of header mounting block 260. The fasteners 202, 204, 206 secure protrusions 222, 224, 226 in the receptacles 262, 264, 266. Fasteners 202, 204, 206 can be threaded to threadingly engage header mounting block 260 with washers to distribute the load on the fastener head. However, any suitable fastener for fasteners 202, 204, 206 is contemplated.

Various aspects of the present disclosure are contemplated. For example, one aspect is direction to a door assembly. The door assembly includes a door having at least one panel movable between an open position and a closed position, and a frame for receiving the door. The frame includes header extending in a first direction along a top of the door, and a jamb extending in a vertical direction transversely to the first direction along a side of the door. The frame also includes a connection system for connecting the header and the jamb. The connection system includes a header mounting block connected to the header and a jamb mounting block connected to the jamb. The jamb mounting block and the header mounting block are engaged to one another with a plurality of protrusions that are received within corresponding ones of a plurality of receptacles. The protrusions and receptacles of the engaged jamb mounting block and the header mounting block align the header and the jamb with one another and support the header on the jamb.

In an embodiment of the door assembly, the plurality of protrusions and plurality of receptacles include a first protrusion and a first receptacle for receiving the first protrusion at a first location between the jamb mounting block and the header mounting block, and a second protrusion and a second receptacle for receiving the second protrusion at a second location between the jamb mounting block and the header mounting block.

In a further embodiment, the first location and the second location are offset from one another in the vertical direction. In yet a further embodiment, the first location and the second locations are offset from one another in a second direction, and the second direction is transverse to the first direction and transverse to the vertical direction.

In a further embodiment, the first location and the second locations are offset laterally from one another in a second direction, and the second direction is transverse to the first direction and transverse to the vertical direction.

In an embodiment of the door assembly, the plurality of protrusions and plurality of recesses include a third protrusion and a third receptacle for receiving the third protrusion at a third location between the first mounting block and the second mounting block. The third location is above the first location, above the second location, and adjacent to a top flange of the header and an upper end of the jamb. In a further embodiment, the top flange of the header is supported by the third protrusion.

In an embodiment of the door assembly, the jamb includes an inner sidewall adjacent the door, an outer sidewall spaced from the inner sidewall, a front sidewall and a back sidewall connecting the inner sidewall and the outer sidewall. The jamb includes an interior passage defined by the inner sidewall, the outer sidewall, the front sidewall, and the back sidewall. The plurality of protrusions extend through the inner sidewall.

In a further embodiment, the inner sidewall includes a cutout in an upper end of the jamb, and a vertically extending channel extending along the inner sidewall from the cutout. The jamb mounting block extends across the cutout and spans the channel. The jamb mounting block is fastened to the inner sidewall on opposite sides of the channel.

In a further embodiment, the plurality of protrusions and the plurality of receptacles include at least one protrusion from the jamb mounting block that is located in the cutout above the channel, and at least one receptacle in the header mounting block that is positioned around the at least one protrusion. In a further embodiment, the header includes a top flange, and the top flange is supported on the at least one protrusion above the channel.

In a further embodiment, the inner sidewall includes a first hole and a second hole spaced from the first hole. The plurality of protrusions are located on the jamb mounting block, and the plurality of protrusions includes a first protrusion extending through the first hole and a second protrusion extending through the second hole.

In an embodiment, the door assembly includes aligned bores in each of the plurality of protrusions that is received within the corresponding one of the plurality of receptacles. A fastener is located in each of the aligned bores to secure the jamb mounting block to the header mounting block.

In an embodiment of the door assembly, the header includes a top flange, a bottom flange, and a back sidewall connecting the top flange and the bottom flange. The plurality of receptacles include a first receptacle defined by the header mounting block along the top flange, a second receptacle defined by the header mounting block along the back sidewall, and a third receptacle define by the header mounting block along the bottom flange. In a further embodiment, the header mounting block is fastened to the top flange with fasteners that extend through the top flange and the bottom flange into the header mounting block.

According to another aspect of the disclosure, a connection system is provided for connecting a header and a jamb of a frame for a door. The connection system includes a jamb mounting block configured to be engaged to an upper end of the jamb, and a header mounting block configured to be engaged to an end of the header. The connection system also includes a plurality of protrusions that extend from at least one of the jamb mounting block and the header mounting block, and a plurality of receptacles that extend into at least one of the jamb mounting block and the header mounting block. The plurality of protrusions and the plurality of receptacles are configured to engage one another to align the header and the jamb and support the header on the jamb.

In an embodiment, the plurality of protrusions extend from the jamb mounting block, the plurality of receptacles extend into the header mounting block, and the plurality of receptacles correspond in shape and size to a corresponding one of the plurality of protrusions.

In a further embodiment, the jamb mounting block includes a first arm that is configured to extend across the jamb, and a first one of the plurality protrusions is located on the first arm. The jamb mounting block also includes a second arm that extends from the first arm that is configured to extend along the jamb, and a second one of the plurality of protrusions is located on the second arm.

In a further embodiment, the second one of the plurality of protrusions is located along an outer edge of the second arm, and a third one of the plurality of protrusions is located at a bottom end of the second arm.

In yet a further embodiment, the header mounting block includes a first receptacle configured to receive the first one of the plurality of protrusions between the header mounting block and a top flange of the header. The header mounting block also includes a second receptacle configured to receive the second one of the plurality of protrusions between the header mounting block and a back wall of the header. The header mounting block further includes a third receptacle configured to receive the third one of the plurality of protrusions between the header mounting block and a bottom flange of the header.

The example and alternative embodiments described above may be combined in a variety of ways with each other. It should be noted that the present disclosure may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying figures and attachments illustrate exemplary embodiments of the invention.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A door assembly, comprising:

a door having at least one panel movable between an open position and a closed position; and a frame for receiving the door, the frame comprising:

a header extending in a first direction along a top of the door;

a jamb extending in a vertical direction transversely to the first direction along a side of the door; and a connection system for connecting the header and the jamb, the connection system comprising a header mounting block connected to the header and a jamb mounting block connected to the jamb, wherein the jamb mounting block and the header mounting block are engaged to one another with a plurality of protrusions that are received within corresponding ones of a plurality of receptacles, wherein the protrusions and receptacles of the engaged jamb mounting block and the header mounting block align the header and the jamb with one another and support the header on the jamb; and wherein a first of the plurality of protrusions is received in a first of the plurality of receptacles at a first location, wherein a second of the plurality of protrusions is received in a second of the plurality of receptacles at a second location, and wherein the first location and the second location are offset from one another in a second direction that is transverse to the first direction.

2. The door assembly of claim 1, wherein the plurality of protrusions and plurality of receptacles comprise:

a first protrusion and a first receptacle for receiving the first protrusion at a first location between the jamb mounting block and the header mounting block; and a second protrusion and a second receptacle for receiving the second protrusion at a second location between the jamb mounting block and the header mounting block.

3. The door assembly of claim 2, wherein the plurality of protrusions and the plurality of receptacles comprise:

a third protrusion and a third receptacle for receiving the third protrusion at a third location between the first mounting block and the second mounting block, wherein the third location is above the first location, above the second location, and adjacent to a top flange of the header and an upper end of the jamb.

4. The door assembly of claim 3, wherein the top flange of the header is supported by the third protrusion.

5. The door assembly of claim 1, further comprising aligned bores in each of the plurality of protrusions and the corresponding one of the plurality of receptacles, and further comprising a fastener in each of the aligned bores to secure the jamb mounting block to the header mounting block.

6. The door assembly of claim 1, wherein:

the header comprises a top flange, a bottom flange, and a back sidewall connecting the top flange and the bottom flange; and the plurality of receptacles comprise:

a first receptacle defined by the header mounting block along the top flange;

a second receptacle defined by the header mounting block along the back sidewall; and a third receptacle define by the header mounting block along the bottom flange.

7. The door assembly of claim 6, wherein the header mounting block is fastened to the top flange with fasteners that extend through the top flange and the bottom flange into the header mounting block.

8. The door assembly of claim 1, wherein the second direction is the vertical direction.

9. The door assembly of claim 1, wherein second direction is transverse to the vertical direction.

10. A door assembly, comprising:

a door having at least one panel movable between an open position and a closed position; and a frame for receiving the door, the frame comprising:

a header extending in a first direction along a top of the door;

a jamb extending in a vertical direction transversely to the first direction along a side of the door; and a connection system for connecting the header and the jamb, the connection system comprising a header mounting block connected to the header and a jamb mounting block connected to the jamb, wherein the jamb mounting block and the header mounting block are engaged to one another with a plurality of protrusions that are received within corresponding ones of a plurality of receptacles, wherein the protrusions and receptacles of the engaged jamb mounting block and the header mounting block align the header and the jamb with one another and support the header on the jamb;

wherein the plurality of protrusions and plurality of receptacles comprise:

a first protrusion and a first receptacle for receiving the first protrusion at a first location between the jamb mounting block and the header mounting block; and a second protrusion and a second receptacle for receiving the second protrusion at a second location between the jamb mounting block and the header mounting block; and wherein the first location and the second location are offset from one another in the vertical direction.

11. The door assembly of claim 10, wherein the first location and the second locations are offset from one another in a second direction, and the second direction is transverse to the first direction and transverse to the vertical direction.

12. A door assembly, comprising:

a door having at least one panel movable between an open position and a closed position; and a frame for receiving the door, the frame comprising:

a header extending in a first direction along a top of the door;

a jamb extending in a vertical direction transversely to the first direction along a side of the door; and a connection system for connecting the header and the jamb, the connection system comprising a header mounting block connected to the header and a jamb mounting block connected to the jamb, wherein the jamb mounting block and the header mounting block are engaged to one another with a plurality of protrusions that are received within corresponding ones of a plurality of receptacles, wherein the protrusions and receptacles of the engaged jamb mounting block and the header mounting block align the header and the jamb with one another and support the header on the jamb;

wherein the plurality of protrusions and plurality of receptacles comprise:

a first protrusion and a first receptacle for receiving the first protrusion at a first location between the jamb mounting block and the header mounting block; and a second protrusion and a second receptacle for receiving the second protrusion at a second location between the jamb mounting block and the header mounting block; and wherein the first location and the second locations are offset laterally from one another in a second direction, and the second direction is transverse to the first direction and transverse to the vertical direction.

13. A door assembly, comprising:

a door having at least one panel movable between an open position and a closed position; and a frame for receiving the door, the frame comprising:

a header extending in a first direction along a top of the door;

a jamb extending in a vertical direction transversely to the first direction along a side of the door; and a connection system for connecting the header and the jamb, the connection system comprising a header mounting block connected to the header and a jamb mounting block connected to the jamb, wherein the jamb mounting block and the header mounting block are engaged to one another with a plurality of protrusions that are received within corresponding ones of a plurality of receptacles, wherein the protrusions and receptacles of the engaged jamb mounting block and the header mounting block align the header and the jamb with one another and support the header on the jamb; and wherein the jamb comprises an inner sidewall positioned adjacent the door; and wherein the plurality of protrusions extend through the inner sidewall of the jamb.

14. The door assembly of claim 13, wherein the inner sidewall comprises:

a cutout in an upper end of the jamb;

a vertically extending channel extending along the inner sidewall from the cutout; and the jamb mounting block extends across the cutout and spans the channel, wherein the jamb mounting block is fastened to the inner sidewall on opposite sides of the channel.

15. The door assembly of claim 14, wherein the protrusions and receptacles comprise:

at least one protrusion from the jamb mounting block that is located in the cutout above the channel; and at least one receptacle in the header mounting block that is positioned around the at least one protrusion.

16. The door assembly of claim 15, wherein the header comprises a top flange, and the top flange is supported on the at least one protrusion above the channel.

17. The door assembly of claim 13, wherein:

the inner sidewall comprises a first hole and a second hole spaced from the first hole; and the plurality of protrusions are located on the jamb mounting block, and the plurality of protrusions comprises a first protrusion extending through the first hole and a second protrusion extending through the second hole.

18. The door assembly of claim 13, wherein the jamb further comprises:

an outer sidewall spaced from the inner sidewall;

a front sidewall and a back sidewall connecting the inner sidewall and the outer sidewall; and an interior passage defined by the inner sidewall, the outer sidewall, the front sidewall, and the back sidewall.

19. A connection system for connecting a header and a jamb of a frame for a door, the header extending in a first direction along a top of the door, the jamb extending in a vertical direction, the connection system comprising:

a jamb mounting block configured to be engaged to an upper end of the jamb;

a header mounting block configured to be engaged to an end of the header;

a plurality of protrusions that extend from at least one of the jamb mounting block and the header mounting block; and a plurality of receptacles that extend into at least one of the jamb mounting block and the header mounting block, wherein the plurality of protrusions and the plurality of receptacles are configured to engage one another to align the header and the jamb and support the header on the jamb; and wherein a first of the plurality of protrusions is received in a first of the plurality of receptacles at a first location, wherein a second of the plurality of protrusions is received in a second of the plurality of receptacles at a second location, and wherein the first location and the second location are offset from one another in a second direction that is transverse to the first direction.

20. The connection system of claim 19, wherein:

the plurality of protrusions extend from the jamb mounting block;

the plurality of receptacles extend into the header mounting block; and the plurality of receptacles correspond in shape and size to a corresponding one of the plurality of protrusions.

21. The connection system of claim 19, wherein the second direction is the vertical direction.

22. The connection system of claim 19, wherein second direction is transverse to the vertical direction.

23. A connection system for connecting a header and a jamb of a frame for a door, the connection system comprising:

a jamb mounting block configured to be engaged to an upper end of the jamb;

a header mounting block configured to be engaged to an end of the header;

a plurality of protrusions that extend from the jamb mounting block; and a plurality of receptacles that extend into the header mounting block, wherein the plurality of protrusions and the plurality of receptacles are configured to engage one another to align the header and the jamb and support the header on the jamb;

wherein the plurality of protrusions extend from the jamb mounting block;

wherein the plurality of receptacles correspond in shape and size to a corresponding one of the plurality of protrusions; and wherein the jamb mounting block comprises:

a first arm that is configured to extend across the jamb, and a first one of the plurality protrusions is located on the first arm; and a second arm that extends from the first arm that is configured to extend along the jamb, and a second one of the plurality of protrusions is located on the second arm.

24. The connection system of claim 23, wherein:

the second one of the plurality of protrusions is located along an outer edge of the second arm; and a third one of the plurality of protrusions is located at a bottom end of the second arm.

25. The connection system of claim 24, wherein the header mounting block comprises:

a first receptacle configured to receive the first one of the plurality of protrusions between the header mounting block and a top flange of the header;

a second receptacle configured to receive the second one of the plurality of protrusions between the header mounting block and a back wall of the header; and a third receptacle configured to receive the third one of the plurality of protrusions between the header mounting block and a bottom flange of the header.

* * * * *